US010277540B2

(12) United States Patent
Arghandiwal et al.

(10) Patent No.: US 10,277,540 B2
(45) Date of Patent: Apr. 30, 2019

(54) SYSTEMS AND METHODS FOR DIGITAL VIDEO JOURNALING

(71) Applicant: Jurni Inc., San Ramon, CA (US)

(72) Inventors: Edreece Arghandiwal, Tracy, CA (US);
Hosna Mogadeddi, Fremont, CA (US);
Jahan Baig, Pleasanton, CA (US);
Brock Drazen, Oakland, CA (US);
Salman Mogaddedi, North Hollywood, CA (US); Vivek Aanand Ganesan, Fremont, CA (US)

( * ) Notice: Subject to any disclaimer, the term of this patent is extended or adjusted under 35 U.S.C. 154(b) by 99 days.

(21) Appl. No.: 15/235,062

(22) Filed: Aug. 11, 2016

(65) Prior Publication Data

US 2018/0048599 A1    Feb. 15, 2018

(51) Int. Cl.
G06F 15/16 (2006.01)
H04L 12/58 (2006.01)
H04L 29/06 (2006.01)
H04L 29/08 (2006.01)

(52) U.S. Cl.
CPC ............ *H04L 51/046* (2013.01); *H04L 51/10* (2013.01); *H04L 51/16* (2013.01); *H04L 51/32* (2013.01); *H04L 65/403* (2013.01); *H04L 65/4084* (2013.01); *H04L 65/607* (2013.01); *H04L 67/02* (2013.01); *H04L 67/10* (2013.01); *H04L 67/26* (2013.01); *H04L 69/24* (2013.01)

(58) Field of Classification Search
CPC ..... H04L 51/046; H04L 51/832; H04L 51/16; H04L 65/403; H04L 67/02; H04L 67/10; H04L 67/26
See application file for complete search history.

(56) References Cited

U.S. PATENT DOCUMENTS

| 8,060,405 | B1* | 11/2011 | Lawrence | G06Q 30/0256 705/14.54 |
| 9,106,887 | B1* | 8/2015 | Owen | H04N 19/102 |
| 9,769,612 | B1* | 9/2017 | Owen | H04W 4/023 |
| 2005/0216300 | A1* | 9/2005 | Appelman | G06Q 10/10 705/319 |
| 2006/0168297 | A1* | 7/2006 | Kang | G10L 19/173 709/231 |
| 2008/0033905 | A1* | 2/2008 | Stokes | G06Q 10/06 |
| 2008/0052630 | A1* | 2/2008 | Rosenbaum | G06F 17/30864 715/738 |

(Continued)

*Primary Examiner* — Michael Won
(74) *Attorney, Agent, or Firm* — IP Informatics; Campbell Yore

(57) ABSTRACT

The invention includes systems and methods of digital video journaling for promoting more meaningful interactions on online social networks. By introducing elements of offline communication including body language, eye contact, and voice tone and inflection, into online communications, the digital journaling platform provides a new social network communication experience. Additionally, the digital video journaling platform described herein focuses content delivery around human emotions such as happiness, sadness, anger, and disgust to enable more personal and meaningful online communication. By combining this emotional emphasis and streaming video conversation platform with image processing techniques, this invention enables unique methods of assembling machine inferred emotional profiles including emotional intensity and affect duration analytics.

15 Claims, 11 Drawing Sheets

(56) References Cited

U.S. PATENT DOCUMENTS

| | | | |
|---|---|---|---|
| 2009/0083260 A1* | 3/2009 | Artom | G06F 17/30817 |
| 2010/0277611 A1* | 11/2010 | Holt | G06F 17/30265 348/231.2 |
| 2010/0306656 A1* | 12/2010 | Moloney | G06F 17/30781 715/723 |
| 2011/0213884 A1* | 9/2011 | Ferris | G06F 9/50 709/226 |
| 2011/0246909 A1* | 10/2011 | Berrett | H04W 4/21 715/753 |
| 2011/0302609 A1* | 12/2011 | Hems | H04N 5/44543 725/40 |
| 2012/0210334 A1* | 8/2012 | Sutedja | G06Q 10/107 719/314 |
| 2012/0331397 A1* | 12/2012 | Eidelson | G06Q 10/107 715/751 |
| 2013/0024521 A1* | 1/2013 | Pocklington | H04L 51/16 709/206 |
| 2013/0031211 A1* | 1/2013 | Johnson | H04N 21/23103 709/218 |
| 2013/0083906 A1* | 4/2013 | Roberts | H04N 7/147 379/88.13 |
| 2013/0254341 A1* | 9/2013 | Ramakrishnan | H04L 47/25 709/219 |
| 2013/0290492 A1* | 10/2013 | ElArabawy | H04L 65/80 709/219 |
| 2014/0139655 A1* | 5/2014 | Mimar | G08B 21/06 348/77 |
| 2014/0150046 A1* | 5/2014 | Epstein | H04N 21/23439 725/126 |
| 2014/0344443 A1* | 11/2014 | MacInnis | H04L 43/08 709/224 |
| 2015/0015790 A1* | 1/2015 | Lee | G09B 5/065 348/607 |
| 2015/0296228 A1* | 10/2015 | Chen | G06F 17/30029 725/34 |
| 2015/0341812 A1* | 11/2015 | Dion | H04W 24/08 370/252 |
| 2016/0014482 A1* | 1/2016 | Chen | G11B 27/031 386/241 |
| 2016/0026352 A1* | 1/2016 | Brown | G06F 3/0484 715/752 |
| 2016/0057154 A1* | 2/2016 | Ferguson | H04L 63/104 726/7 |
| 2016/0134740 A1* | 5/2016 | Gal | H04M 1/72522 455/456.3 |
| 2016/0196584 A1* | 7/2016 | Franklin | G06Q 30/0267 705/14.64 |
| 2016/0205164 A1* | 7/2016 | Schmidt | H04L 1/0001 709/219 |
| 2017/0019474 A1* | 1/2017 | Tevosyan | H04L 67/1095 |
| 2017/0180435 A1* | 6/2017 | Edwards | H04L 65/4069 |
| 2018/0048599 A1* | 2/2018 | Arghandiwal | H04L 51/046 |

* cited by examiner

SYSTEMS AND METHODS FOR DIGITAL VIDEO JOURNALING

FIELD OF INVENTION

In general, the present technology relates to social networking and video content sharing implemented using distributed computing and storage environments. More specifically, this technology comprises a platform for identifying and conducting discussions of topical and emotional interest in digital video within a social network.

BACKGROUND

The emergence of mobile computing over the last quarter century has revolutionized human social interaction. In many societies, the combination of ubiquitous smartphones and robust wireless network infrastructure for delivering digital media content is transforming the way traditional social tasks are performed. Once exclusively conducted offline, activities such as shopping, dating, socializing with friends, touring new places, and receiving professional advice are rapidly moving to digital space. As the amount of digital content available and the use of digital social platforms increases, more sophisticated forms of online reputation, cyber security, data analytics, and artificial intelligence will emerge. Advances in these areas have the potential to make social interactions over the Internet feel more natural, secure, personal, and meaningful.

Journaling is the centuries old practice of keeping track what happens in ones life. Although many approaches and methods exist, traditional journaling was a private activity. The journal or diary was a place for people to record their most personal thoughts and impactful experiences. Whether plucked from the remains of soldiers fallen in battle, etched in stone amongst the ruins of an ancient civilization, or past down along familial lines from generation to generation, journals provide some of the most compelling and insightful anthropologic accounts of the human experience. Historically, journals were personal objects and their contents were typically kept private until after the author had died or published their memoirs. This all changed in the late 1990s with the advent of a new type of journal, the blog.

In the new millennium, blogs on the Internet are nearly as numerous as the connected devices capable of accessing them. Similar to the entries of traditional journals, blogs are written in "posts"—or a series of relatively short, informally styled accounts concerning a particular topic, person's life, or series of events. Digital social networking platforms such as TWITTER, FACEBOOK, INSTAGRAM, and SNAPCHAT are each fundamentally different formats of blogging. These services capitalize on the human impulse of keeping track of life experiences to generate massive amounts of user created content. Users of these social media platforms can effortlessly post text, photos, videos, and links to information they like or find significant on a personal webpage. This personalized content is then published to a network of users who can view and interact with it.

Ideally, this exchange of ideas fosters meaningful interactions between people who have never met but have a lot in common. Unfortunately, meaningful interactions happen rarely on currently available social media platforms and click bait, mindless distractions, and narcissistic bragging are much more the norm. The invention described herein, improves upon existing social media platforms by bringing more elements of the traditional journaling experience online in hopes of providing more opportunities for authentic, meaningful social interactions. The digital video journaling platform introduces body language, eye contact, and voice tone and inflection into the social networking experience by providing methods of conversing in streaming video. By bring elements of offline social interactions online this invention makes social interactions over the Internet more natural and personal. Additionally, the invention focuses social network interactions on emotions to give people opportunities to forge emotional connections with others who are not physically present.

Moreover, this invention combines its emotional focus with digital image and video processing to develop new data analytics methods. By building a rich contextual semantic affect categorization for self-identified and machine inferred user emotions, the digital video journaling platform can detect emotional intensity and affect duration in uploaded video objects. It can then use this library to match video objects expressing a particular emotion with other video objects expressing the same emotion at a similar intensity with similar affect duration. This user specific library of digital emotion profiles can also be combined with location and affect-based targeting to facilitate more meaningful offline interactions such as dating, socializing with friends, or—in the case of affect targeted advertising—shopping.

SUMMARY OF INVENTION

Various embodiments of the present disclosure can include systems, methods, and non-transitory computer readable media configured to provide a digital video journaling platform. A digital video journaling platform may comprise features enabling users to carry out a version of the traditional journaling process using a computer. In one embodiment, these features include digital video journal recording, emotion tagging and topic tagging. Additional video journaling platform embodiments contain features for creating an interactive journaling experience using a social network, for example comment threads and content feeds. Comment threads enable users to submit video messages commenting on the emotional or topical content contained in digital video journals uploaded to the digital video journaling platform's social network. In at least one embodiment, comment threads are structured to promote meaningful social interactions with generous video length upload parameters and curated personal threads which allow video journal authors and commenting users to communicate one on one. Content feeds generate content users are likely to find interesting based on the topics and other user accounts they are following. In at least one embodiment, content feeds are generated from manually entered user preferences. In other embodiments, content feeds are generated automatically from user analytics profiles containing user activity records and user emotion and affect profiles.

Various system architecture embodiments for implementing a digital video journaling platform are also described herein. In at least one embodiment, the system architecture comprises an application stack implemented on a distributed cloud storage and computing system. One variation of this cloud storage and computing system contains a object storage module for storing video objects and a cloud computing module comprising a plurality of computing instances for responding to database queries, deploying asynchronous workers to send messages and launch transcoding and updating jobs, and storing video object metadata, content feeds, user analytics profiles, and user information in block storage. Additional components include a queue service module for listing transcoding and updating tasks, an analytics module for developing personalized content feeds based on user activity and user affect and emotion profiles stored in user analytics profiles, and a security module for authorizing API requests and securing the system against data breaches, leaks, and loss. At least one embodiment of the system architecture is adapted to deliver video journals, comment videos, and reply videos using adaptive bit rate streaming over a content delivery network.

DETAILED DESCRIPTION

Figure 1:
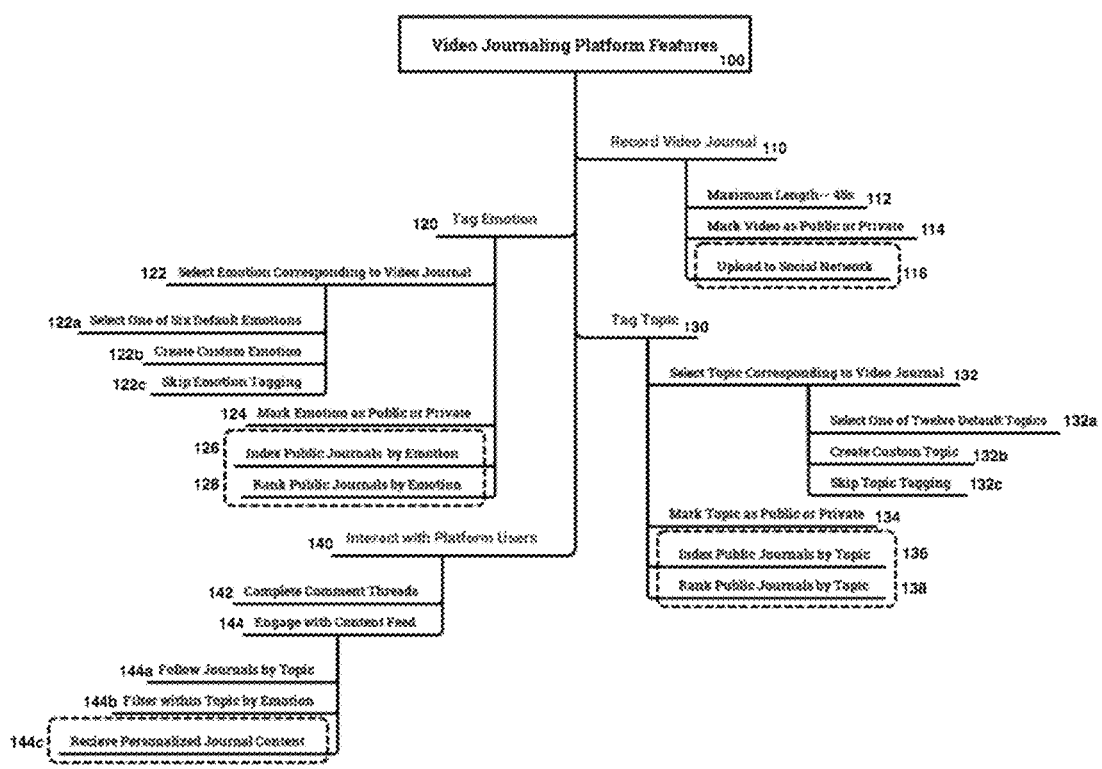
FIG. 1 illustrates the four primary features of one embodiment of the digital video journaling platform described herein, video journal recording, emotion tagging, topic tagging, and social network interactions.

In general, FIG. 1 summarizes the functionality provided by one example of the digital journaling platform described herein. The video recording, tagging, and commenting features delivered by this platform are described in a video journaling platform features 100 flow map. The digital journaling platform is implemented on a distributed computing and storage architecture described in FIG. 3. Users interact with the digital journaling platform using a conventional computer system executing at least one of a Microsoft Windows compatible operating system (OS), Windows Mobile, Android, Apple IOS, Apple OS X, macOS, or Linux distribution. Conventional computer systems that may be used with this technology include a desktop, laptop, tablet, mobile telephone, smartphone, and any other electronic computing device connected to the Internet. To interact with the functionality described in the video journaling platform user flow 100, user devices can execute an application, for example a browser application. User devices can also interact with the digital journaling platform through an application programming interface (API) provided by the native operating system of the user device.

Steps inside the dashed box are performed by a computer system comprising the digital journaling platform's backend. Users interacting with the digital journaling platform's front end through the browser application or API perform all other steps. In this example, a social network comprises a plurality of communicatively coupled devices running instances of the digital video journaling platform described herein. The plurality of devices may connect to the social network using standard communications technologies and protocols. The social network can also include links using technologies such as Ethernet, 702.11, worldwide interoperability for microwave access (WiMAX), 3G, 4G, CDMA, GSM, LTE, digital subscriber line (DSL), etc. The network protocols used to communicate on the social network can include multiprotocol label switching (MPLS), transmission control protocol/Internet protocol (TCP/IP), user datagram protocol (UDP), hypertext transport protocol (HTTP) simple mail transfer protocol (SMTP), file transfer protocol (FTP), and the like. Data exchanged over the social network can be presented using technologies and formats including hypertext markup language (HTML) and extensible markup language (XML). In addition, all or some links can be encrypted using conventional encryption technologies such as secure sockets layer (SSL), transport layer security (TLS), and Internet protocol security (IPsec).

To use the system to create a digital video journal, a user records a video journal 110. In this example, the maximum length of a video journal recording is 45 seconds 112. In other embodiments, the maximum length may be longer—up to several minutes—shorter—only a couple of seconds—or variable depending on desired use or user's personal preference. In this example, before uploading the recorded video journal to a social network 116 provided by the digital video journaling platform, users mark recorded videos as public or private 114. Public videos are shared publicly on the digital video journaling platform so all users can view and comment on the video. Private videos are shared privately on the digital video journaling platform and made available to only the author's personal account or other groups authorized by the author such as the author's followers or accounts following the author. Other groups that may be authorized by the author to view private videos include the author's friends on other social networks, email or telephone contacts, or accounts that request and obtain permission from the author to view private videos. The privacy settings in this digital video journaling platform embodiment give users complete control over video recordings they create to deliver a personalized and—when desired—private video journaling experience. In this embodiment, once a video journal is uploaded to the social network 116 provided by the digital video journaling platform, a computer system reformats the video for storage and playback via high bit rate video streaming.

After recording a video, users may enter the tagging phase of this system. In this example, the tagging phase is two fold with emotion tagging preceding topic tagging. In one embodiment, users may add emotion and topic tags to video journals they create. In other examples, users may add emotion or topic tags to video journals created by other users and shared publicly or privately with their accounts. In this example of emotion tagging 120, users tag uploaded video journals with emotions corresponding to the feelings users express in their video journals 122. Users may select one of six default emotions to describe their video journal 122a. In this example, the six default emotions provided by the digital video journaling platform are happy, sad, scared, angry, surprised, and disgusted. Users may choose to tag their video journal with one of these emotions or create their own custom emotion tag 122b. In the alternative, users may choose not to add emotion tags to their video journals and skip emotion tagging 122c. In cases where users add at least one emotion tag to a video journal, users choose to mark the emotion tag as public or private 124. Similar to the privacy settings for video journals, emotions marked public can be viewed by all users of the digital video journaling platform while access is restricted to emotions marked private. Accordingly, private emotion tags are shared privately on the digital video journaling platform and made available to only the author's personal account or other groups authorized by the author such as the author's followers or accounts following the author. Other groups that may be authorized by the author to view private emotion tags include the author's friends on other social networks, email or telephone contacts, or accounts that request and obtain permission from the author to view private emotion tags. In this example, public videos with public emotion tags are indexed by emotion 126 using a computer system to enable users to filter video journals by emotion. Public video journals with public emotion tags are also ranked by popularity 128 using a computer system to enable users to readily find, for example the most viewed videos with the "surprised" emotion tag.

After users add emotion tags or skip emotion tagging, they may add topic tags to uploaded video journals 130. In this example, to add topic tags, users select topics corresponding to their uploaded video journals 132. Users may select one of the twelve default topics 132a, create a custom topic tag 132b, or skip topic tagging 132c. The twelve default topics available in this example of the digital video journaling platform include art, business, confessions, design, fashion, food, health, inspiration, live, love, sport, and tech. In instances where users add topic tags, users choose to mark topic tags as public or private. Similar to the privacy settings for emotion tags, topics tags marked public can be viewed by all users of the digital video journaling platform while access is restricted to topic tags marked private. Private topic tags are shared privately on the digital video journaling platform and made available to only the author's personal account or other groups authorized by the author such as the author's followers or accounts following the author. Other groups that may be authorized by the author to view private topic tags include the author's friends on other social networks, email or telephone contacts, or accounts that request and obtain permission from the author to view private topic tags. In instances of public video journals with public topic tags, a computer system indexes journals by topic 136 to enable users to search for public video journals by topic. Additionally, public video journals with public topic tags are ranked by popularity 138 using a computer system to enable users to easily find, for example the most viewed video journals with the "tech" topic tag.

After users record and tag video journals, they enter the social interaction phase. In this section of the video journaling process, users interact with other users of the digital video journaling platform 140 by completing comment threads 142 and engaging with content feeds 144. In this example, a comment thread comprises three sequential video recordings allowing users to have conservations entirely in video within the digital video journaling platform. The first video is the original video journal post created in 110. The second video is a reply comment posted by another user in response to the original video journal. The third video is a reply video in response to the reply comment. For public videos, all users can, post reply comments, view reply comments, and playback entire comment threads. In this embodiment, video journal posts, reply comments, and reply videos have a maximum length of 45 seconds. Additionally, any user can post a reply comment, but only the creator of the original video journal can record a reply video in response to a reply comment. Additionally, while all users may playback any comment thread on a public video, only one user can post a comment video to a comment thread. Accordingly, each user seeking to comment on a video journal starts her own comment thread with the author of the original video journal. In this example, the number of comment threads per video journal is unlimited, but the number of users able to interact by posting videos within that comment thread is limited to two—the author of the original post and the author the reply comment. This embodiment further limits the number of videos per comment thread to three. Users seeking to continue conversations beyond three videos may do so by opening another comment thread. This example is just one variation of the digital video journaling system described herein. Other examples provide for comment threads of more than three videos and allow more than two users to interact in a comment thread. Comment threads in other examples accommodate up to hundreds or thousands of videos and hundreds or thousands of users in a single comment thread. After users record reply comments and reply videos, each is uploaded to the social network provided by the digital video journaling platform and reformatted for storage and distribution via high bit streaming.

In addition to completing comment threads 142, users can also interact with other users of the digital video journaling platform 140 by engaging with content feeds 144. In this embodiment, content feeds are selections of video journals posted to user instances of the digital video journaling platform. Content feeds can be personalized according to user preferences so that the digital video journaling platform automatically suggests content users are likely to appreciate. In some embodiments, users manually customize content feeds by recording their content preferences. This example supports two primary methods of manual content feed customization—following journals by topic 144a and filtering within a topic by emotion 144b. To follow journals by topic 144a, users input topics of interest—such as sports or tech—and the video journaling platform automatically adds new video journals with the selected topic tags to user content feeds 144c. To filter within a topic by emotion 144b, users filter the videos in their content feeds by the emotion tags they want to view, for example surprised or happy. Using this combination of topic and emotion searching, users can view a selection of videos with their preferred topic and emotion tags, for example design video journals with the surprised emotion. Emotion filtering content feeds personalized by topic delivers a more meaningful and personal social network experience by allowing users to choose the emotions they want to feel when using the digital video journaling platform.

In other embodiments, users receive personalized journal content 144c without manually entering content preferences. In these examples, the digital video journaling platform records user activity within the social network to develop a user analytics profile. Activities that may be monitored to create user analytics profiles include emotion and topic tags applied to video journals, subject matter of video journals watched, subject matter of comment videos submitted, user accounts followed, and subject matter submitted by user accounts followed. Optionally, user analytics profiles may contain metrics relevant to topic and emotion interest such as the most common topic and emotion tags for watched videos and uploaded video journals. The most common topic and emotion tags used by accounts the user is following and appearing in the videos the user as started comment threads on may also be recorded in the user analytics profile. From the user analytics profiles, instances of the digital video journaling platform automatically suggest content to users based on the topic and emotion tags users have most frequently used, interacted with, and viewed. User analytics profiles may be automatically updated to reflect new user activity. In turn, the updated analytics profiles influence the content suggested allowing users to receive personalized journal content 144c without manually submitting content preferences. Some examples of automatically generated personalized content feeds are implemented using machine learning algorithms, soft artificial intelligence, and other examples of customized program logic.

Figure 1A:
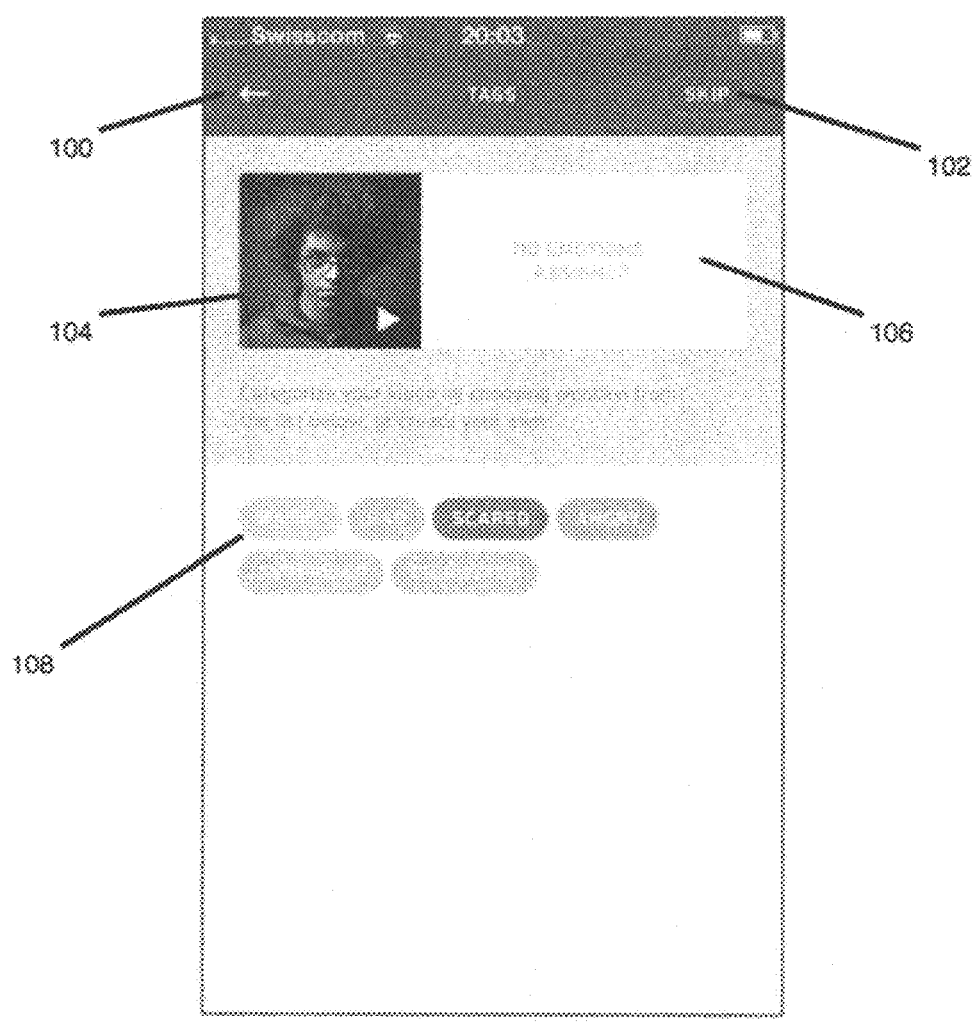
FIG. 1A illustrates an example emotion tagging screen provided by the digital video journaling platform described herein.

FIG. 1A illustrates one example emotion tagging screen within the digital video journaling system described herein. In this example, pressing the "back" button 100 returns users to the record video screen and pressing the "skip" button 102 uploads video journals without adding emotion tags. A preview screenshot of the user's video journal 104 is displayed just below the universal header and—in this example—pressing the thumbnail begins playback of the video journal so users can preview videos before uploading. In this embodiment, after completing playback, users are returned to the emotion tagging screen. Adjacent to the preview screenshot is the emotion tag queue 106. This queue displays the emotion tags selected for addition to the video journal. In this example, when users select emotion tags to apply to their videos from the emotion tag repository 108, the emotion tags appear in the queue 106. Emotion tags can be deleted from the post by pressing them when they appear in the queue 106. Additionally, users can add their own custom emotion tags by pressing the create new button (not pictured here but identical to the button in FIG. 1B).

Figure 1B:
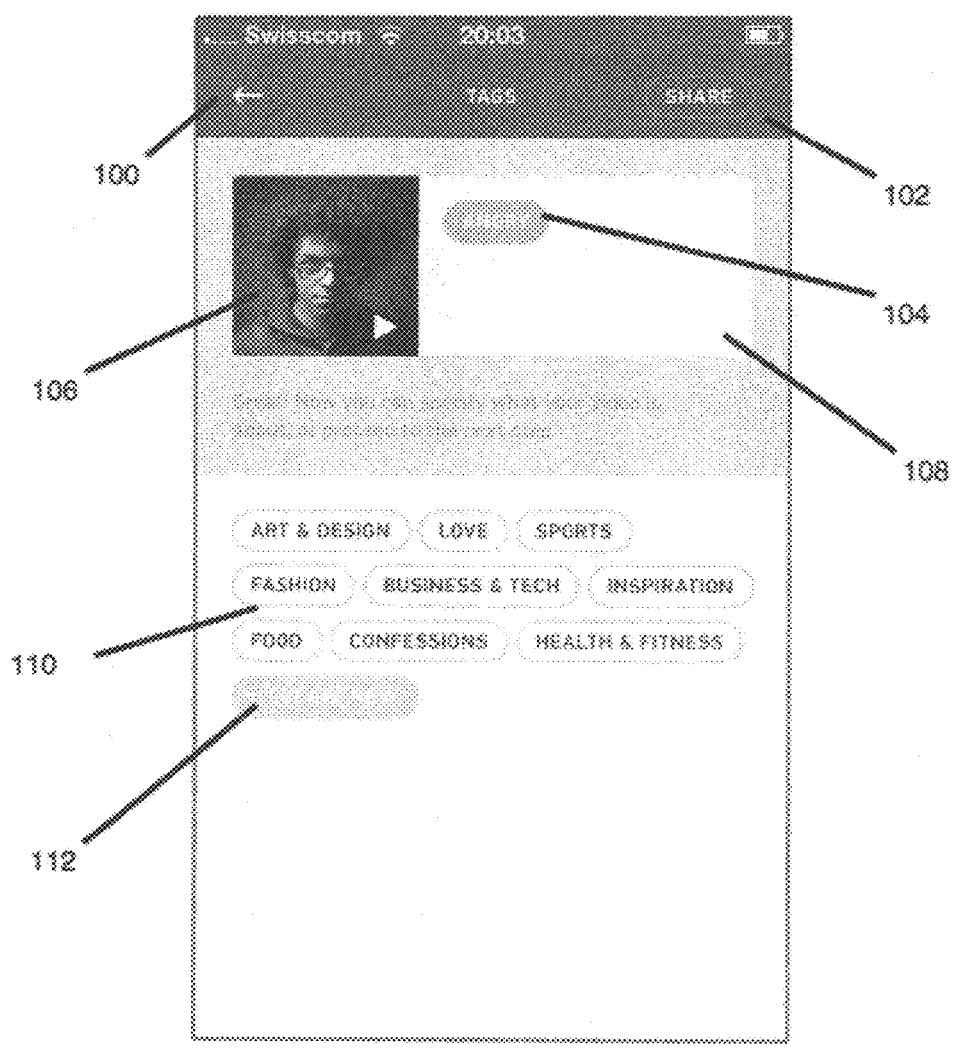
FIG. 1B illustrates an example topic tagging screen provided by the digital video journaling platform described herein.

FIG. 1B illustrates one example topic tagging screen within the video journaling system described herein. In this example, pressing the "back" button 100 returns the user to the emotion tagging screen and pressing the "share" button 102 uploads video journals without adding topic tags. In cases where users added emotion tags using the previous emotion tagging screen, selected emotion tags 104 appear in the topic tagging queue 108. If no emotion tags were added, the topic tagging queue 108 will be blank until at least one topic tag is selected. Adjacent to the topic tagging queue 108 is a preview screenshot of the user's video journal 106. In this example, pressing the preview screenshot 106 begins playback of the video journal allowing users to preview their journal before completing topic tagging and uploading. Below the preview screenshot 106 and topic tagging queue 108 is the topic tag repository 110 containing all of the default topic tags provided in this example. In addition to this default list, users may create their own custom topic tags by pressing the "create new" button 112 within the topic tag repository 110.

Figure 2:
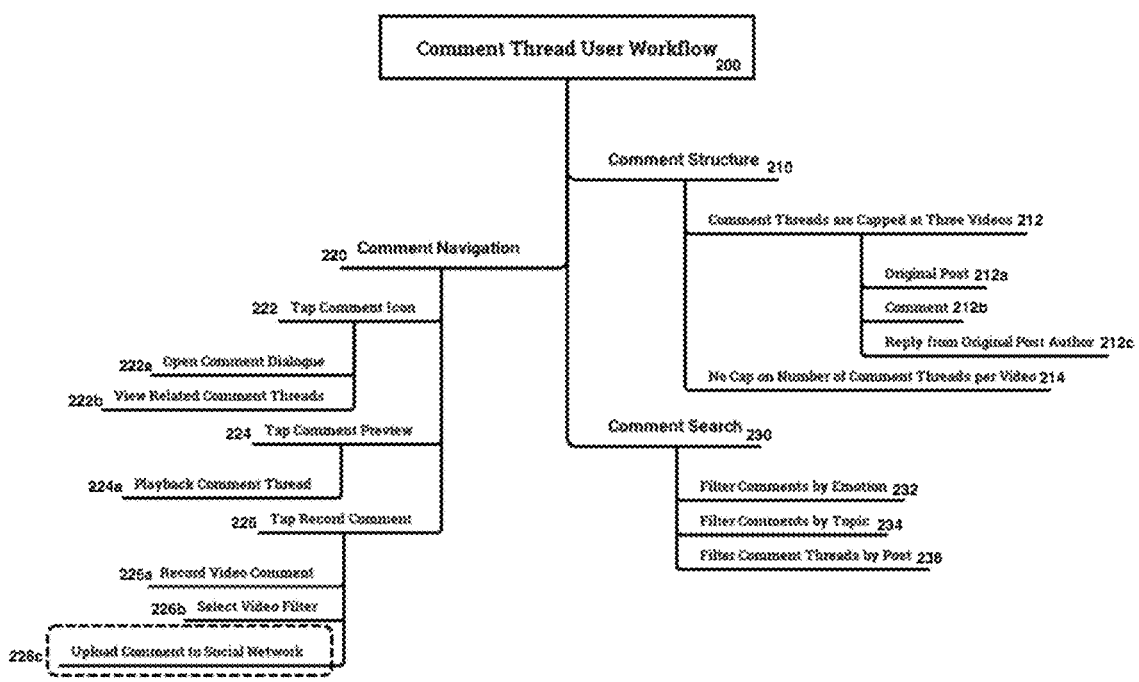
FIG. 2 illustrates the comment thread parameters and a sample user workflow for exploring the primary commenting features—navigation and search—within one embodiment of the digital video journaling platform described herein.

FIG. 2 provides an in-depth illustration of the comment phase described above in FIG. 1. The comment thread user flow 200 divides the commenting functionality delivered by the video journaling system described herein into three components—comment structure 210, comment navigation 220, and comment search 230. Comment structure contains the comment thread parameters used in this example. In this embodiment, comment threads are capped at three videos 212. These videos include an original post 212a, a comment 212b, and a reply from the original post author 212c. In this example, only the author of the original post may reply to a comment. Users may view but not reply directly to comment threads started by others. Instead, users engage with original post authors in new comment threads. Users may start new comment threads by posting their own comment videos on the author's original post. Alternatively, users may engage with the author of a comment video by starting a comment thread on the comment video. The original posts, comment videos, and reply videos are uploaded sequentially and all users of the digital video journaling platform can view public videos. For private videos, the author of the original post can restrict the viewing audience to selected groups which may comprise at least one of the authors account only, users following the author, or users followed by the author. While only three videos per comment thread are provided in this example, there is no cap on the number of comment threads per video 214. Additionally, other embodiments of the video journaling system described herein provide for hundreds or thousands of videos and users per comment thread.

Comment navigation 220 explains how users navigate within the example commenting system described herein. To view comment threads for video journals, users tap the comment icon below the video 222. Pressing the comment icon opens the comment dialogue 222a and allows users to view related comment threads 222b. In this example, comment dialogue includes all videos in a comment thread and related comment threads comprising comment threads started on the original post and comment threads started on comment videos made on the original post. In this example, users tap comment preview 224 to playback an entire comment thread 224a automatically from start to finish with no interruptions. In other embodiments, comment thread playback may be interrupted between and during videos by a media interjection, for example an advertising photo, message, or video. To record a comment video or reply video, users tap record comment 226. Pressing the record comment button opens a record video comment screen 226a for users to record comments and select video filters 226b. Video filers manipulate the appearance of video comments as if the video was recorded using a lens with a particular optical distortion or effect. Once a user is satisfied with their comment or reply video and filter, they upload the video comment to the social network 226c provided by the digital video journaling platform. Once uploaded, a computer system reformats the video file for storage and playback to users of the social network via high bit rate streaming.

Comment search 230 explains how users search for comment videos. To search for comment videos with a particular emotion, for example surprised or happy, users may filter comments by emotion 232. To search for comment videos with a particular topic, for example design or tech, users may filter comment videos by topic 234. Alternatively, users may search comment threads by post 236. In this example, posts are ranked by popularity and indexed by emotion, topic, and user. Accordingly, users can filter posts by ranking, emotion, topic, and user then view the comment threads attached to these posts to find comment videos that are related to their topic of interest.

Figure 2A:
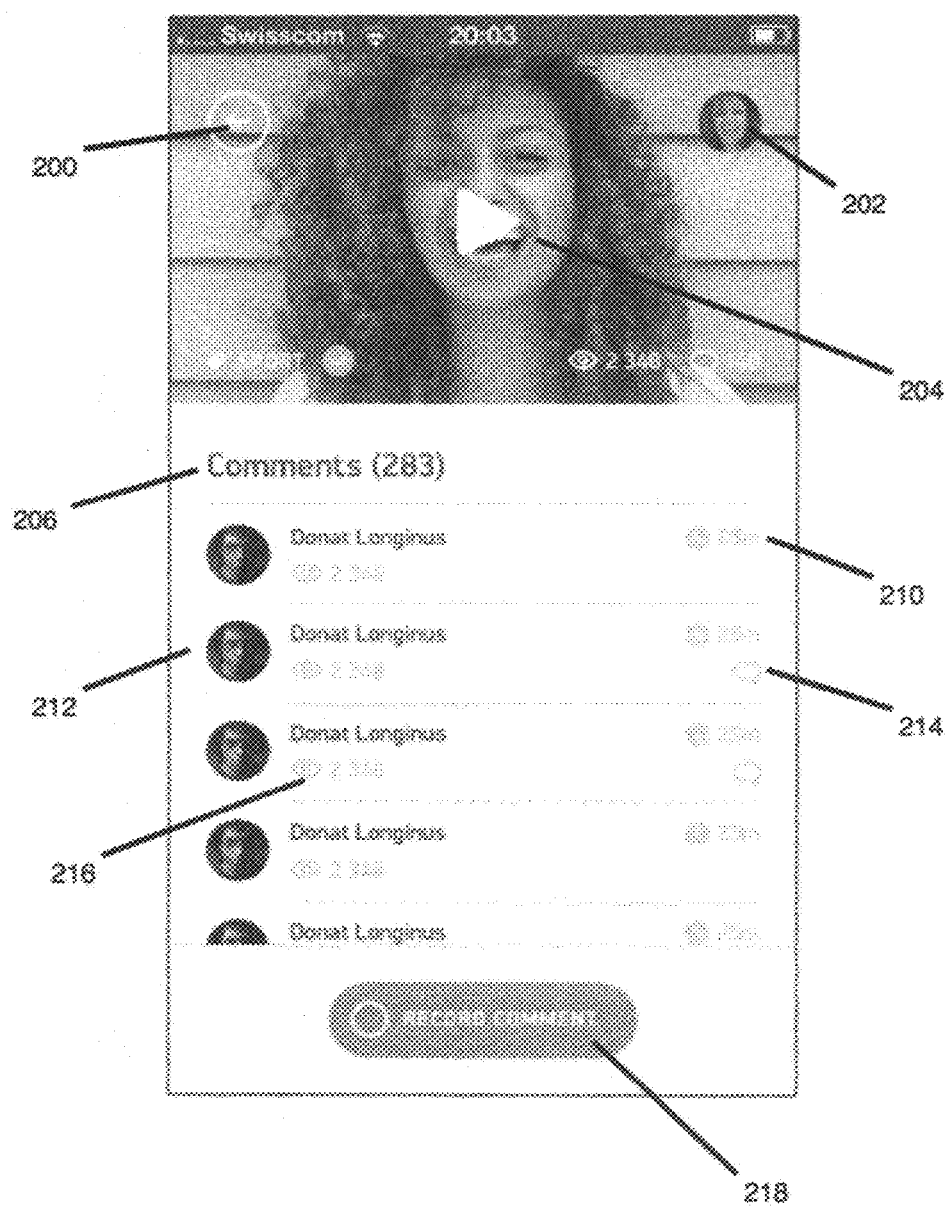
FIG. 2A illustrates an example digital video journal comment overview screen provided by the digital video journaling platform described herein.

FIG. 2A illustrates one example of a video commenting screen within the video journaling system described herein. In this example, pressing the "back" button 200 returns the user to her content feed and pressing the "user thumbnail button" 202 navigates to the user profile page of the author of the video journal displayed on the screen. Tapping the "play" button 204 streams the video journal in place above the previously submitted comment queue 206. At the top of the comment queue, is the word "Comments" followed by the total number of comments so far submitted for this video journal "283". Other information embedded within the comment queue 206 includes a thumbnail of the profile picture for every user submitting a comment 212 as well as how many times user comments are viewed 216. The time the comment was submitted 210 also appears on the right side of the comment queue 206 along with a "text bubble icon" 214 indicating whether a comment thread has been started on that comment. Below the comment queue 206 is a "record comment" button 218. Pressing the "record comment" button 218 begins the comment recording process by initializing cameras on user devices and launching the record comment screen within user instances of the digital video journaling platform.

Figure 2B:
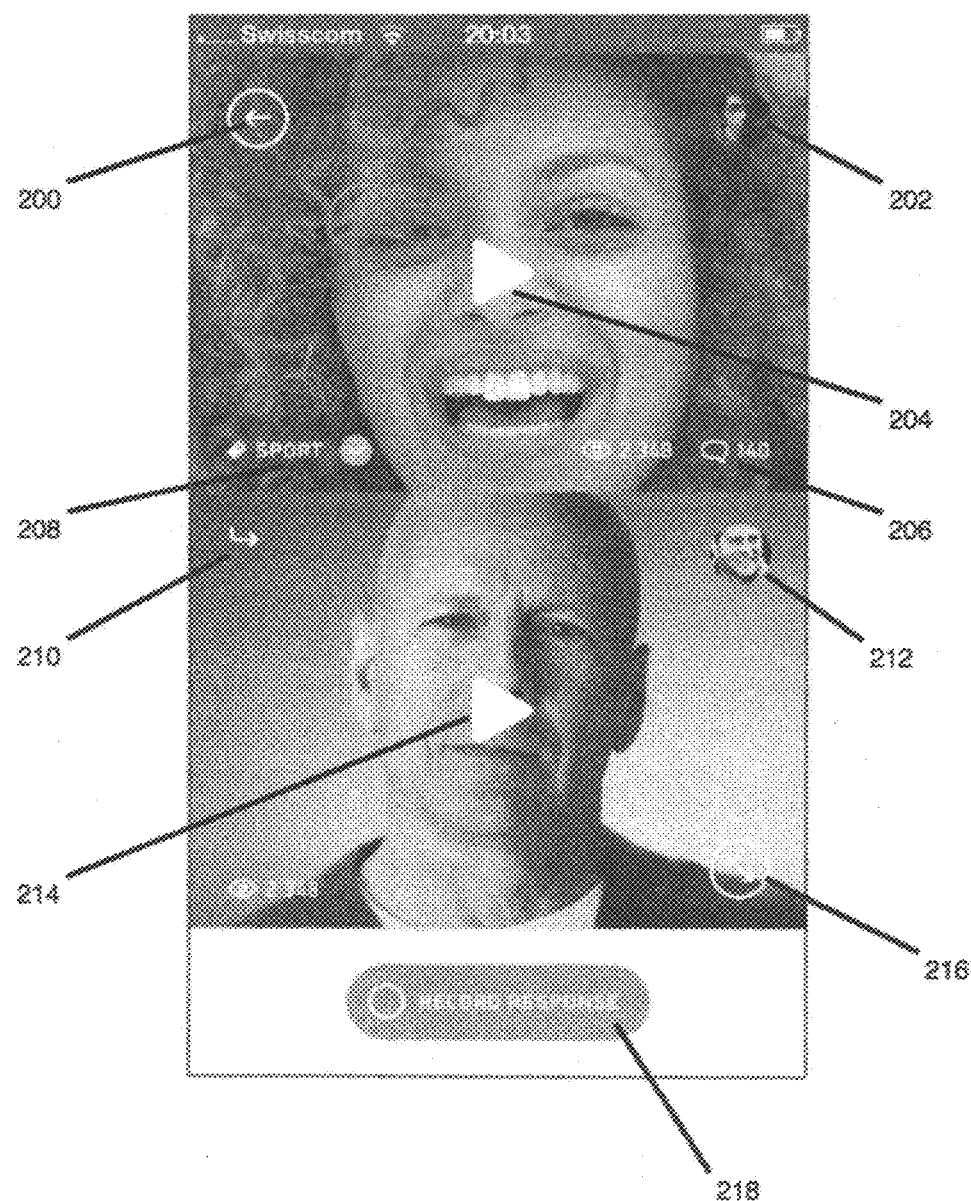
FIG. 2B illustrates an example record reply video screen provided by the digital video journaling platform described herein.

FIG. 2B illustrates one example of the record response screen within the video journaling system described herein. To respond to a video comment by recording a reply video, users press the "record response" button 218 at the bottom of the screen. In this embodiment, only the author of the original post can respond to a video comment and video comment threads are limited to three videos. In other embodiments, any user can respond to a video comment and comment threads may contain hundreds or thousands of videos. Pressing the "back" button 200 at the top left of the screen returns users to the comment page for the original post as depicted in FIG. 2A. Pressing the "user thumbnail button" 202, 212 navigates to the user profile page for the author of video journal in which the thumbnail profile picture is embedded. Pressing the "play" button 204, 214 begins playback of the video journal in place on a split screen while tapping the "full screen" button 216 launches playback of the video in full screen. In this embodiment, absent further action, the entire comment thread will automatically playback sequentially in full screen once users tap the "full screen" button 216. Additionally, pressing the "play" button on the top video will automatically begin playback of the comment video once playback of the top video as concluded. Pressing the "return" button 210 pauses playback. The topic tags of the original post 208 are displayed in the footer at the bottom of the screen portion displaying the original post. If the user follows that topic, a green "check mark" will appear next to that topic. If the user does not follow that topic, a "plus mark" will appear next to that topic. In this embodiment, users can follow topics by pressing the "plus mark". This action causes video journals tagged with that topic to be added to a user's content feed and changes the "plus mark" to a "check mark". The number of comment threads added to the original post is also displayed in the footer next to the "text bubble icon" 206.

Figure 2C:
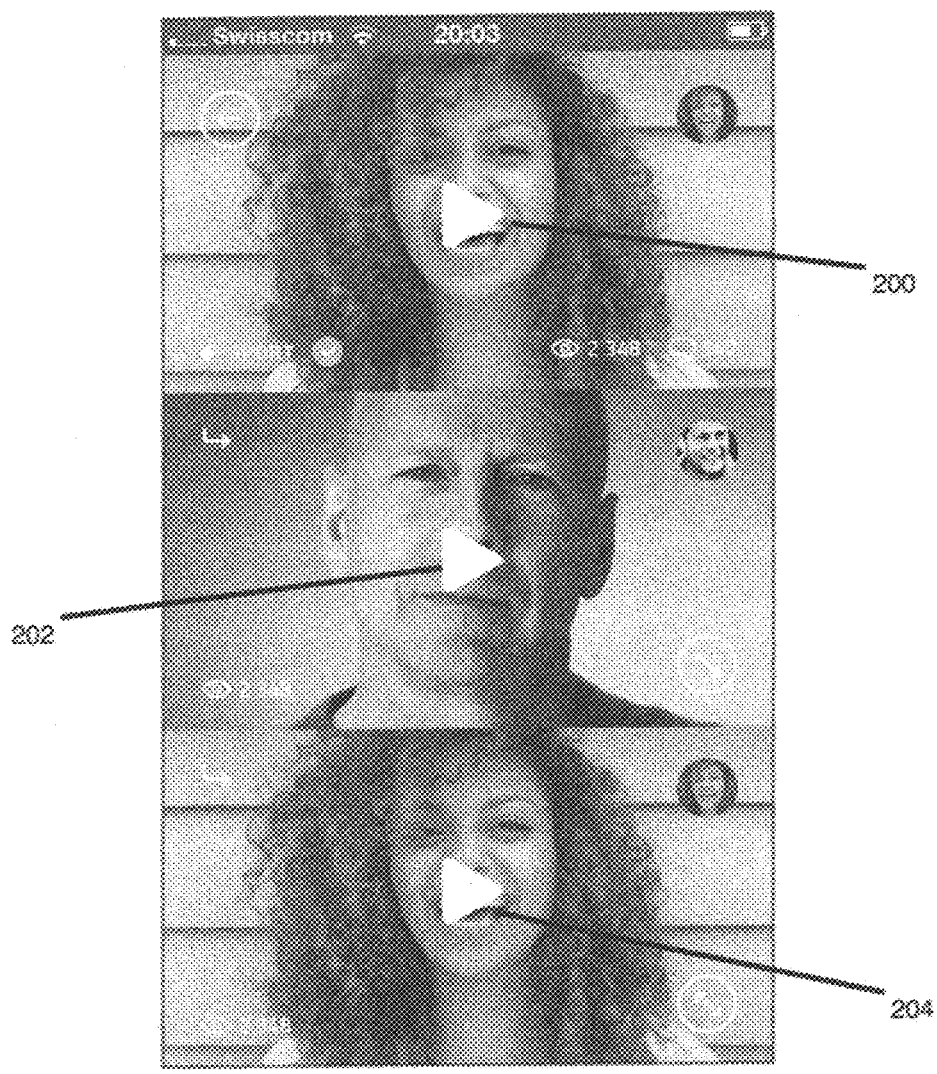
FIG. 2C illustrates an example comment thread overview screen provided by the digital video journaling platform described herein.

FIG. 2C illustrates a completed comment screen within the video journaling application described herein. The original post 200 is positioned in the top third of the screen. The comment video 202 is positioned in the middle third of the screen, and the reply video 204 is positioned in the bottom third of the screen. In this embodiment, all users can start a comment thread by posting a comment video 202 on an original post 200, but only the author of the original post can respond to comments by posting a reply video 204. Accordingly, there can be many comment threads started on one original post or comment video, but each comment thread is limited to two participants and three videos. In other embodiments, comment thread participants and videos are not restricted.

Figure 2D:
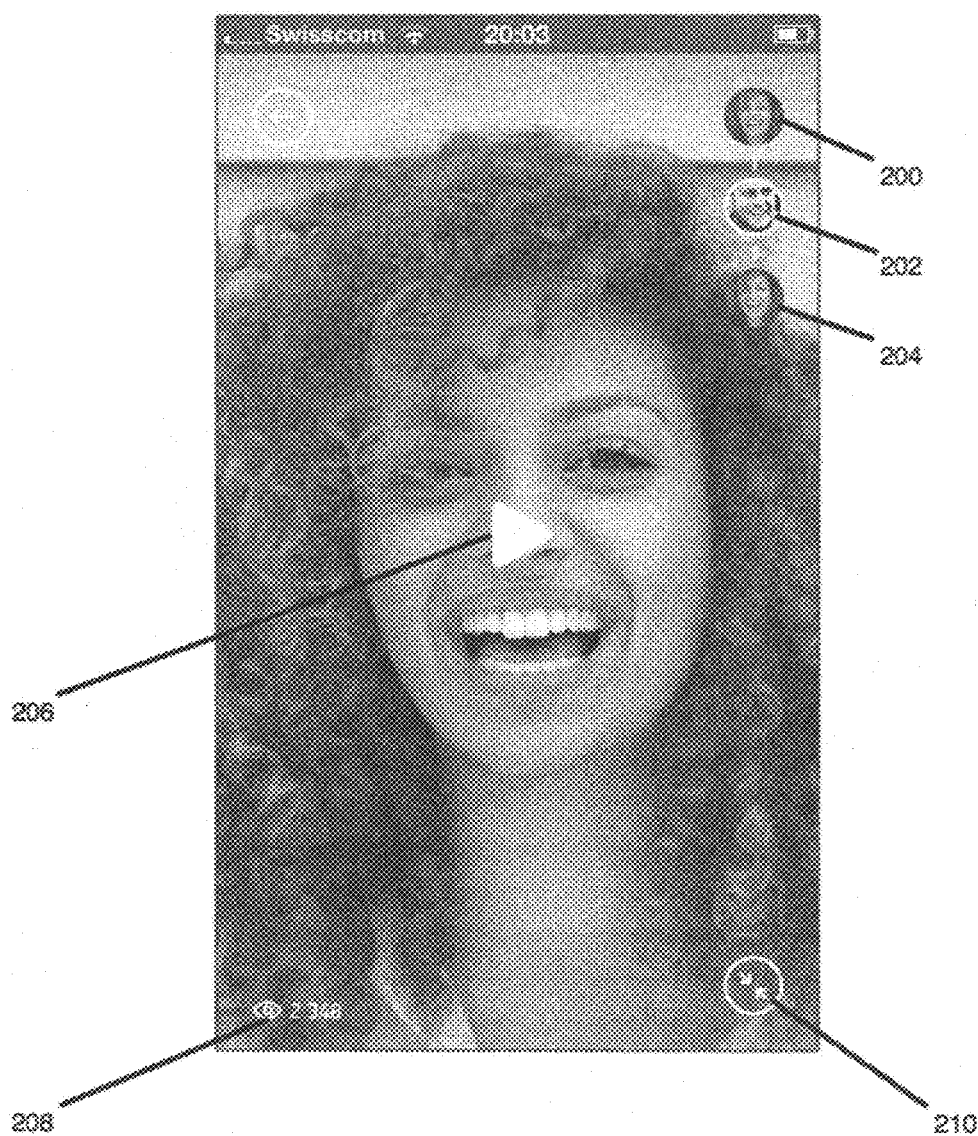
FIG. 2D illustrates an example full screen comment thread playback screen provided by the digital video journaling platform described herein.
Figure 3:
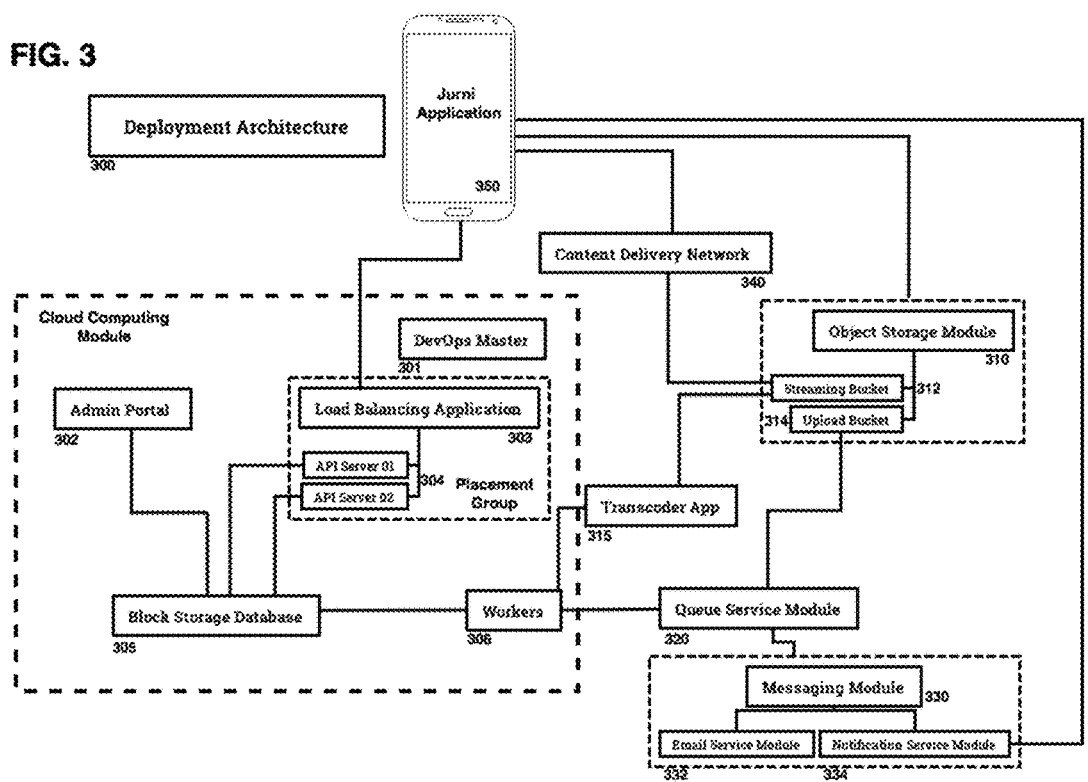
FIG. 3 is a block diagram of one example deployment architecture used to deliver the front end functionality of the digital video journaling platform described herein.

FIG. 2D depicts a full screen comment thread display within the video journaling platform described herein. In this embodiment, the original post is shown in full screen and pressing the "play" button 206 begins playback of the entire comment thread. Additionally, the number of times the original post has been viewed is displayed next to the "eye icon" 208 at the bottom of the screen. Thumbnails of the profile pictures of the authors of each video in the comment thread are displayed in a chain in the upper right corner of the screen. The thumbnail of the author of the original post 200 is displayed at the top, the thumbnail of the author of the comment video 202 is in the middle, and the thumbnail of the author of the reply video 204 is at the bottom. In this embodiment, the videos comprising the comment thread playback sequentially. When a post authored by a user depicted in the thumbnail plays on screen the thumbnail of that author is highlighted allowing users to track where they are in the comment thread using the linked thumbnails. Pressing the "collapse" button 210 at the bottom of the screen navigates to the completed comment overview screen shown in FIG. 2C FIG. 3 illustrates one example cloud storage and computing architecture used to support the video commenting and streaming functionality described herein. In this example, the architecture is deployed in multiple application environments to support development, staging, and production. Each application environment is a self-contained application stack that can act as an independent backend for supporting a mobile application front end. This embodiment operates in three environments. A production environment is the live endpoint of the frontend application and available for download over the Internet. A staging environment provides isolated testing and validation independent of the production environment. This environment supports integration testing and is used for pre-production testing of new features and bug fixes. Changes to either the backend cloud architecture or the frontend mobile application can be tested in the staging environment before being integrated into the production environment and made available for public download. Lastly, this architecture operates in a development environment so that new API features can be created and tested independent of the staging and production environments.

The cloud based deployment architecture uses numerous cloud applications, virtual machines (VMs), and asynchronous workers to launch, setup, run, and maintain the frontend functionality delivered by the mobile application. In this embodiment, applications including the API servers 304, DevOps Master VM 301, Admin Portal 302, block storage database 305, asynchronous workers 306, transcoder app 315, queue service module 320, and messaging module are configured to run on distributed cloud computing instances, for example the Elastic Compute Cloud (EC2) provided by Amazon Web Services.

In general, to launch and setup the cloud infrastructure, the DevOps Master VM 301 executes automation scripts written in ruby. More specifically, these automation scripts create the cloud computing instances—including API Servers 01 and 02 304—put them in the correct placement group, configure the instances according the their application environment, and insure against stack overflow and data loss by placing them behind a load balancing application 303. Additional automation scripts contained in—and executed by—the DevOps Master VM 301 create, setup, and configure the streaming bucket 312 and upload bucket 314 within the object storage module 310. In this example, the streaming bucket 312 and the upload bucket 314 are contained within the object storage database hosted by the object storage module 310. The object storage module may be a form of cloud storage, for example Amazon Simple Storage Service (S3) provided by Amazon Web Services.

The DevOps Master VM 301 also executes automation scripts for creating the queue service module 320 and queuing tasks, for example video transcoder jobs and database updates, within this application. Communication types and events triggering communications sent from the notification service module 334, within the messaging module 330, are also created by automation scripts executed by the DevOps Master VM 301. To deliver steaming video, the DevOps Master VM 301 hosts and executes automation scripts for creating transcoder pipelines used by the transcoder app 315 to transcode uploaded content into streaming format fit for adaptive bit rate streaming.

In this example, content including all types of media, for example video, audio, etc., is delivered using a type of adaptive bit rate technology, for example Smooth Streaming, HTTP Live Streaming (HLS), HTTP Dynamic Streaming (HDS), UpLynk, QuavStreams, MPEG DASH, etc. In one embodiment, a selected video journal message is delivered using Smooth Streaming by Microsoft, a form of Web-based media content delivery that uses HTTP. Instead of delivering media as full-file download, or as a persistent and stateful stream, content delivered using adaptive bit rate streaming is sent to clients or applications within instances of the digital video journaling application as a series of MPEG-4 (MP4) chunks or fragments that can be cached at edge servers. In this embodiment, uploaded video objects will be transcoded and otherwise reformated for steaming by asynchronous workers 306 executing the transcoder app 315.

To format for streaming, the selection of content is broken into several sequential fragments. Typically, these sequential fragments represent a given amount of time, for example two seconds of content, five seconds of content, ten seconds of content, etc. Once fragmented, content delivery may be adapted according to available quality levels or delivery profiles. For example, a content delivery network may be storing three files representing the first five seconds of a movie. One of the three files may be low quality, one may be mid-quality, and one may be high quality. In practice, a client running on a device compatible with adaptive bit rate streaming technology requests the highest quality it thinks it can receive and render to a user without stuttering, freezing, etc.

In many cases, devices running streaming clients within instances of the digital video journaling platform use heuristics to monitor current device and network conditions. These devices can switch the video quality of the streaming media to account for circumstances detected at the device, for example buffer fill and network conditions. The streaming techniques employed herein are truly adaptive in the sense that as a client is playing one fragment representing a first sequential chunk, network conditions may change and, in response the client can issue a request for a subsequent fragment that is encoded at a different bit rate. This helps the client play the highest quality media available without stuttering, buffering, or freezing.

In preparing and delivering video objects for streaming, transcoders, for digital to digital conversions, and encoders, for analog to digital conversions, can convert prerecorded or live media into the aforementioned sequential chunks or fragments of media. For a given chunk, for example the first portion of the video object, the content may be encoded at several different quality levels. Accordingly, there may be a Fragment1-low quality chunk, a Fragment1-mid quality chunk, a Fragment1-high quality chunk, a Fragment2-low quality chunk, etc. The encoded or transcoded media file chunks may be available from a network and a manifest or playlist may be created that provides an indication of how to request a given chunk from the network. In some embodiments, media may be pre-encoded or pre-transcoded and stored such that each video fragment is offered in several different profiles and the location of each profile of each fragment is included in the manifest. In practice, a client may use the manifest to identify a uniform resource identifier (URI) for a desired fragment and may utilize HTTP to request that fragment.

In this embodiment, different servers within a content delivery network 340 may be streaming the media at different quality levels in a way that marks the different sequential fragments within the stream to allow a client to request one chunk from a high quality stream and a sequential chunk from a different quality stream. In some embodiments, the manifest may include addresses that are translatable in a way that allows a given request from a client to be understood as a request for a marked fragment from within a live stream and a next request as a request for a sequential fragment from within a different live stream.

Adaptive bit rate technologies used to deliver video objects in this example can use HTTP to take advantage of the scale of existing HTTP content delivery networks, which allow content producers and distributors to keep content closer to the audience. Unlike traditional streaming, adaptive streaming can use standard HTTP to deliver cacheable MPEG-4 (MP4) fragments, which may help eliminate the need for provisioning a streaming server network with the required number of stateful streaming sessions. As a result, two remotely located clients may request the same content, and the content may be delivered from two different edge servers that are unaware of one another.

In practice, when an digital video journaling platform instance issues a request for adaptively streamed media, a Web server may deliver a manifest, for example an extensible markup language (XML) document that describes the available profiles or quality levels and where they are located. A given instance can then consider the manifest and use some appropriate heuristic(s), for example buffer fill, network latency, etc., to determine the right file to request in order to receive a subsequent chunk of media at an appropriate quality level in time to facilitate a seamless presentation of the content to a user. In some systems, the manifest may contain URIs and names in their unobfuscated form. The system could use several types of files for example .ismc, .isma, PIFF, .m3ub, .ts, etc. The file name of the client manifest file could match the file name of the server manifest. In some systems, the manifest may contain modified locators, translated locators, etc.

To deliver content to instances of the digital video journaling platform using adaptive bit rate streaming, the DevOps Master VM 301 hosts and executes automation scripts for creating and configuring content delivery network 340 distributions. The DevOps Master VM 301 acts as the backend control center for the digital video journaling platform by deploying automation scripts to setup, operate, and maintain applications comprising the backend architecture. In some embodiments, the DevOps Master VM 301 is the same for each application environment. In other examples, the DevOps Master VM 301 is optimized for each application environment to maximize performance and minimize operating costs.

The Admin Portal 302 is a separate ruby on rails web application written in AngularJS to expose a rails API. The Admin Portal 302 allows for certain executive management functions including user management and content curation. The messaging module 330 contains an email service module for sending email messages, for example a confirmation email when a new user joins or a reset email when a user requests a password reset. The messaging module 330 also comprises a notification service module 334 for notifying worker instances and sending push notifications to users. All uploaded content including videos and profile pictures is stored in the object storage module 310. Uploaded media is kept in the upload bucket 314. To provide streaming video playback when requested via the API servers 304, asynchronous workers 306 launch transcoder jobs executed by the transcoder app 315 to transcode media in the upload bucket 314 into streaming format and push it to the streaming bucket 312. Asynchronous workers 306 also update the block storage database 305 and push updates to user feeds when new content is uploaded.

In this example, many types of asynchronous workers 306 are deployed as daemons—computer programs that run as a background process rather than being under the direct control of the user—to optimize the system for efficiency and standardize the user experience. There may be several types of asynchronous workers 306 or worker instances deployed in this architecture with each specialized to perform a particular task. For example, monitoring worker instances may monitor the queue service module for new video uploads, transcoding worker instances may transcode or encode uploaded video objects into video objects formatted for streaming, and updating worker instances may update content feeds as new video content is uploaded.

Unlike media content, application metadata such as video rank, topic popularity, and number of views as well as user account information including user name, email, password, and user reputation are stored in the block storage database 305. User profile analytics including user activity and topic and emotion preferences are also stored in the block storage database 305. In this example, storage is bifurcated between object and block storage so that media can be stored as objects to optimize for content retrieval and delivery while metadata and other text files are stored in block format to allow for incremental changes without needing to rewrite the entire file. The queue service module 320 forms the intersection between the object storage module 310 and the cloud computing module by supporting decoupling of cloud storage and computing applications. To form this intersection, the queue service module 320 separates the fetch and decode stages from the execution stage by managing a cloud of asynchronous workers to rapidly retrieve objects stored on cloud storage applications upon requests submitted by cloud computing applications.

For purposes of illustrating a clear example, the API used in this example architecture is written using the ruby on rails framework within the ruby language. The block storage database 305 is a MongoDB hosted on block storage volumes, the web server used to push content to the frontend application is Nginx configured with a wildcard SSL certificate, and the API Servers 304 for searching, filtering, a retrieving stored content is Phusion Passenger. Each of the components run on the Ubuntu operating system. The specific version of each software component used in this example is given below:

Ubuntu 14.04 Trusty Tahir
Ruby 2.2.1p85
Rails 4.2.1
Mongo version 3.0.2
Nginx 1.6.2
Phusion Passenger 5.0.6

This list is not meant to be exhaustive or limit the scope of invention. One of ordinary skill in the art would immediately recognize there are several variations of database, API, web server, API server, and operating system products and configurations that could be substituted for the versions listed above without limiting performance or functionality.

Figure 4:
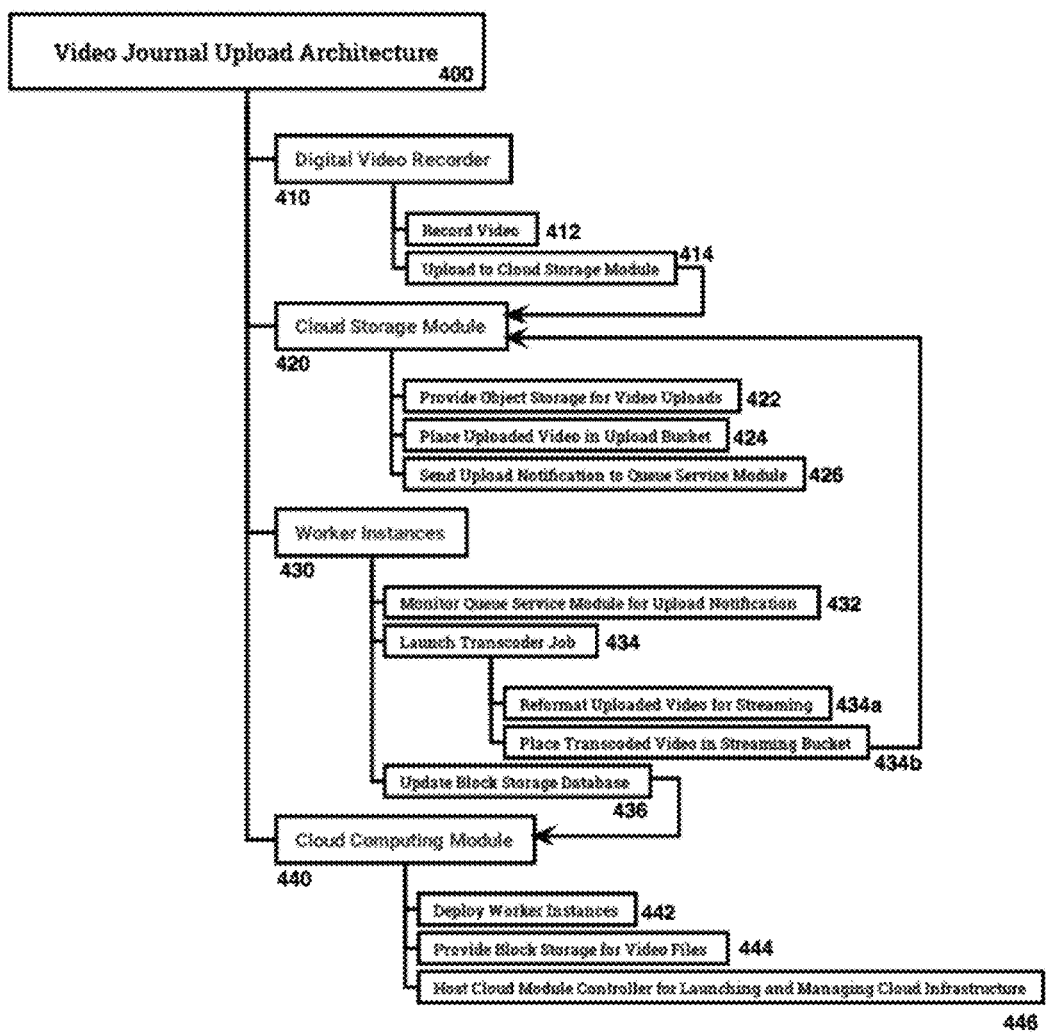
FIG. 4 illustrates one example of a video journal upload architecture deployed to upload video messages to the digital video journaling platform described herein.

FIG. 4 illustrates an example architecture used to upload video journals to the video journaling platform described herein. This video journal upload architecture 400 comprises a digital video recorder 410, cloud storage module 420, worker instances 430, and cloud computing module 440. The digital video recorder 410 may be embedded within a tablet, smartphone, camera phone, computer, or any other mobile electronic device capable of connecting to the Internet and recording digital video files. The cloud storage module 420, worker instances 430, and cloud computing module 440 may be software modules, virtual machine instances, or any other type of programming logic capable of running on cloud computing platforms in order to send, receive, and process data.

To upload a video journal using the example architecture provided in FIG. 3, video is recorded 412 and uploaded to the cloud storage module 414 through wired or wireless transmissions to cloud server computer systems, virtual machine instances, or other cloud based hardware platforms. Video uploaded to the example architecture is sent to the cloud storage module 420, which provides object storage for video uploads 422. When new video files are uploaded, the cloud storage module 420 places the uploaded video in the upload bucket 424 and sends a video upload notification to the queue service module 426. Worker instances 430 monitoring queue service for video upload notifications 432 launch transcoder jobs 434 upon receiving notice of each new upload. To complete transcoder jobs, worker instances 430 reformat uploaded video for streaming 434a and place transcoded video in the streaming bucket 434b within the cloud storage module 420. Worker instances 430 then update the block storage database 436 within the cloud computing module 440 to incorporate the newly updated content and add uploaded video to appropriate user content feeds. In this example, transcoder worker instances post notifications of completed transcoder jobs to the queue service module. Separate updating worker instances monitor the queue service module for completed transcoder jobs. After each video journal transcoder job is completed, the updating worker instances update user feeds. After each comment or reply video transcoder job is completed, the updating worker instances update user feeds and send a notification to original post and comment video authors.

In addition to hosting cloud computing and storage module controllers for launching and managing the entire upload, storage, and streaming cloud infrastructure 446, the cloud computing module 440 deploys worker instances 442 and provides block storage for all information processed by the video journaling system described herein. Information stored on a database within the cloud computing module 440 includes video files, user profiles, user analytics profiles including user activity records and user emotion and affect profiles, template user emotion and affect profiles, user metadata, video metadata, passwords, emails, machine instance logs, user content feeds, security logs, content analytics, messaging logs, and system performance logs.

Figure 5:
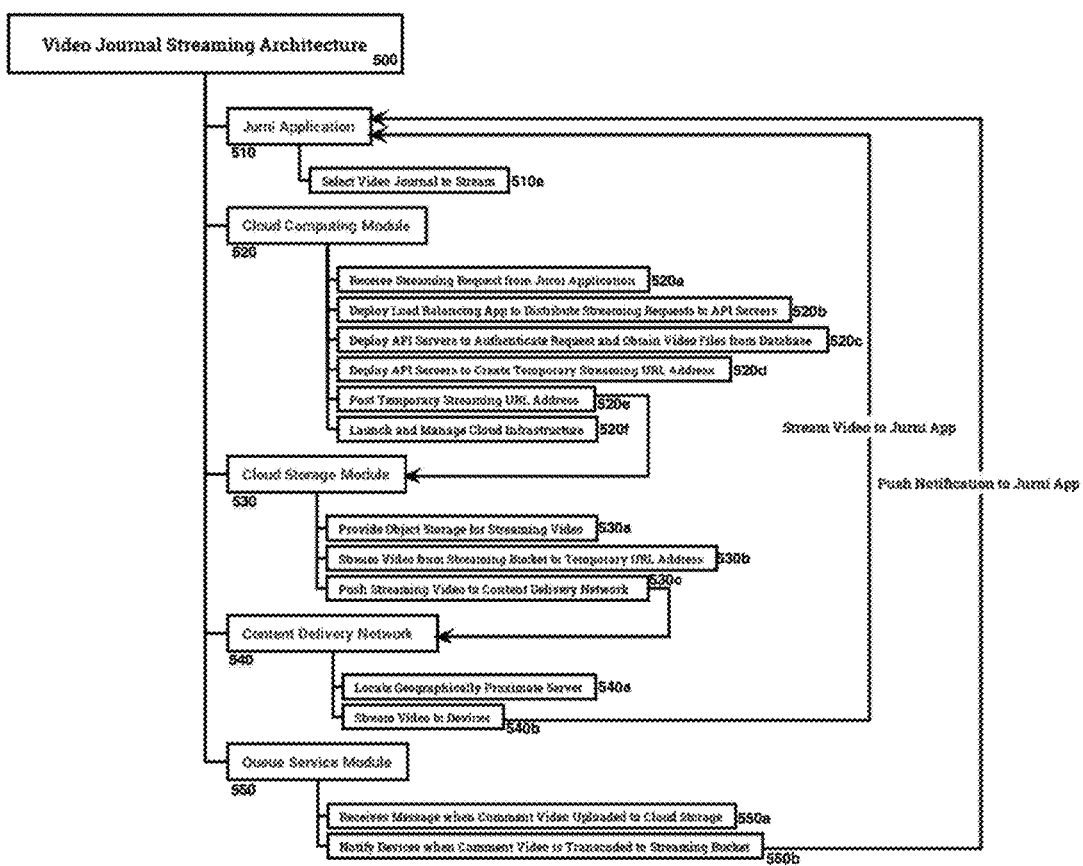
FIG. 5 illustrates one example of a video journal streaming architecture deployed to stream video messages from the digital video journaling platform described herein.

FIG. 5 illustrates an example architecture for streaming video within the video journaling platform described herein. The video journal streaming architecture 500 comprises a device running an instance of the digital video journaling platform 510, cloud computing module 520, cloud storage module 530, content delivery network 540, and queue service module 550. In this example, the digital video journaling platform instance running on a device 510 comprises software modules for creating, viewing, and interacting with video journals. Devices running instances of the digital video journaling application may be tablets, smartphones, laptop computers, desktop computers, or other traditional or mobile computing devices. The content delivery network 540 comprises a network of geographically disperse, communicatively coupled computer systems designed to facilitate adaptive bit rate video streaming. The cloud computing module 520, cloud storage module 530, and queue service module 550 are software modules, virtual machine instances, or other types of programming logic capable of running on cloud computing platforms in order to send, receive, and process data. In this example, automation scripts for launching, running, and maintaining the video journal streaming architecture 500 are stored in the cloud computing module 520. Accordingly, the cloud computing module 520 serves as the architecture's control center by launching and managing the cloud infrastructure 520f further described herein.

To stream videos using the example architecture, videos are selected for streaming 510a from within the digital video journaling platform 510. The cloud computing module 520 receives streaming requests from the digital video journaling platform 520a and deploys a load balancing app to distribute a plurality of streaming requests to API servers 520b. To secure the system against distributed domain name server (DDOS) and other fraudulent request based hacks, API servers, in this example, authenticate video streaming requests as valid requests originating from within the digital video journaling platform and obtain video files from a database 520c. API servers then create a temporary streaming uniform resource location (URL) address 520d and post the temporary URL address to the cloud storage module 530. In addition to providing object storage for streaming video 530a in the streaming bucket, the cloud storage module 530 recognizes the temporary URL address and streams video from the streaming bucket to the temporary URL address 530b. To enhance streaming reliability and speed, the cloud storage module 530 pushes streaming video to the content delivery network 530c. Once the content delivery network 540 receives a video object, it locates a server geographically proximate to the streaming request 540a and streams video to the device 540b originating the streaming request from the geographically proximate server. When users comment on videos they stream, they upload video to the video journaling computer system using the process described in FIG. 4. When a new video comment is uploaded to the upload bucket in the cloud storage module 530, the queue service module 550 receives a message verifying the new comment video upload 550a. After the uploaded video has been transcoded by worker instances, the queue service module 550 sends a push notification to the social network provided by the digital video journaling platform to notify the device registered to the author of the original post that a comment video has added to their post and transcoded to the streaming bucket 550b.

We claim:

1. A computer implemented method for having a conversation comprising:
    providing a computer system having one or more communicatively coupled server side components deployed on one or more cloud computer servers, the components comprising a cloud computing module for interfacing with a plurality of client applications and a content delivery network, each client application associated with a unique application account;
    receiving, by a computer system the cloud computing module, a first video message from a first application account, the first video message containing user generated video content, the content comprising at least one emotion, the first video message having one or more emotion tags and the user generated video content depicting the expression of an emotion included in the one or more emotion tags;
    distributing, by a content delivery network, the first video message to a social network using adaptive bit rate streaming;
    receiving, by the computer system cloud computing module, a second video message from a second application account commenting on the at least one emotion tag in common with content in the first video message;
    distributing, by the content delivery network, a first conditioned video thread comprising the first video message and the second video message to the social network using adaptive bit rate streaming, the first conditioned video thread allowing all unique application accounts to view the first conditioned video thread and limiting application accounts able to comment on the first conditioned video thread to the first application account and the second application account;
    receiving, by the computer system, a third video message from a third application account responding to the at least one emotion tag in common with content in the first video message;
    distributing, by a content delivery network, a second conditioned video thread containing the first video message, and the third video message to a social network using adaptive bit rate streaming, the second conditioned video thread allowing all unique application accounts to view the second conditioned video thread and limiting application accounts able to record a subsequent video message commenting on the second conditioned video thread to the first application account and the second application account.

2. The method of claim 1, further comprising sending, by the computer system cloud computing module, to the first application account, a notification containing a link to a video recording screen for recording a fourth video message responding to the second video message and the third video message.

3. The method of claim 2, further comprising sending, by the first computer system cloud computing module, to the second application account, a notification containing a link for viewing the second conditioned video thread.

4. The method of claim 1, further comprising tagging wherein at least one of the first video message, second video message, or third video message comprises with at least one topic tag.

5. The method of claim 4, wherein the at least one topic tag is one of the default topic tags included on the computer system, the default topic tags comprise selected from the group consisting of art, business, confessions, design, fashion, food, health, inspiration, live, love, sport, and tech, alternatively the topic tag is a custom tag.

6. A computer implemented method comprising:
providing a server system having one or more communicatively coupled server side components deployed on the server system, the communicatively coupled server side components comprising a cloud computing module for interfacing with a plurality of client applications and a transcoder application for interfacing with a content delivery network, each client application associated with a unique application account;
receiving, by the cloud computing module, a first video message from a first application account, the first video message containing user generated video content, the content comprising at least one emotion, the first video message having one or more emotion tags and the user generated video content depicting the expression of an emotion included in the one or more emotion tags;
formatting, by the transcoder application, the first video message into streaming format for adaptive bit rate streaming;
distributing, by the content delivery network, a streaming format version of the first video message to a social network using adaptive bit rate streaming, wherein the streaming format version of the first video message is provided by the transcoder application;
receiving, by the cloud computing module, a second video message from a second application account commenting on the at least one emotion tag in common with the first video message;
formatting, by the transcoder application, a video thread comprising the first video message and the second video message into streaming format for adaptive bit rate streaming;
distributing, by the content delivery network, a first conditioned video thread comprising the first video message and the second video message to the social network using adaptive bit rate streaming, the first conditioned video thread allowing all unique application accounts to view the first conditioned video thread and limiting application accounts able to comment on the first conditioned video thread to the first application account and the second application account;
receiving, by the computer system, a third video message from a third application account responding to the at least one emotion tag in common with content in the first video message; and
distributing, by a content delivery network, a second conditioned video thread containing the first video message and the third video message to a social network using adaptive bit rate streaming, the second conditioned video thread allowing all unique application accounts to view the second conditioned video thread and limiting application accounts able to record a subsequent video message commenting on the second conditioned video thread to the first application account and the second application account.

7. The method of claim 6, further comprising receiving, by the cloud computing module, a third video message having at least one emotion tag in common with the first video message and the second video message, the third video message comprising content relating to at least one emotion tag associated with the first video message and the second video message, the third video message submitted by a application account that also submitted the first video message.

8. The method of claim 7, further comprising formatting, by the transcoder application, a second video thread comprising the first video message, the second video message, and the third video message into streaming format for adaptive bit rate streaming; and
distributing, by a content delivery network, the second video thread using adaptive bit rate streaming, wherein the streaming format version of the second video thread is provided by the transcoder application.

9. The method of claim 6, further comprising providing by the cloud computing module to the one or more client applications, a user interface for selecting at least one emotion tag to associate with at least one of the first video message or the second video message, the user interface having a feature limiting recording of the third video message to the application account submitting the first video message.

10. The method of claim 6, further comprising providing by the cloud computing module to the one or more client applications, a user interface for creating a custom emotion tag and associating the custom emotion tag with at least one of the first video message or the second video message.

11. The method of claim 6, wherein the communicatively coupled server side components further comprise one or more asynchronous workers and a messaging module having a notification service, the one or more asynchronous workers interface with the cloud storage module and the messaging module, the messaging module interfaces with the one or more client applications.

12. The method of claim 11, further comprising monitoring, by the one or more asynchronous workers, video messages received by the cloud computing module;
detecting, by the one or more asynchronous workers, a receipt of the second video message by the cloud computing module; and
sending, by the one or more asynchronous workers, a communication to the messaging module indicating the receipt of the second video message by the cloud computing module.

13. The method of claim 12, further comprising receiving by the notification service within the messaging module a communication from the one or more asynchronous workers indicating the second video message has been uploaded to the cloud computing module; and
delivering, by the notification service to a client application submitting the first video message, a push notification containing a means for accessing the second video message.

14. The method of claim 6, wherein the first video message and the second video message comprising at least 15 seconds of user generated video content.

15. The method of claim 14, wherein reformatting the first video message and the second video message transcoder application reformats the first video message and the second video message for storage and playback via high bitrate streaming.

* * * * *